(12) United States Patent
Linthorst et al.

(10) Patent No.: US 12,522,139 B2
(45) Date of Patent: Jan. 13, 2026

(54) FASTENING CONSTRUCTION, EXTERIOR VISION UNIT OF A MOTOR VEHICLE AND METHOD FOR ASSEMBLING OR DISASSEMBLING A FASTENING CONSTRUCTION

(71) Applicant: MCi (Mirror Controls International) Netherlands B.V., Woerden (NL)

(72) Inventors: Patrick Johannes Linthorst, Woerden (NL); Vincent Huibert Van Rooijen, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 687 days.

(21) Appl. No.: 17/770,958

(22) PCT Filed: Oct. 21, 2020

(86) PCT No.: PCT/NL2020/050648
§ 371 (c)(1),
(2) Date: Apr. 21, 2022

(87) PCT Pub. No.: WO2021/080422
PCT Pub. Date: Apr. 29, 2021

(65) Prior Publication Data
US 2022/0363192 A1    Nov. 17, 2022

(30) Foreign Application Priority Data
Oct. 22, 2019  (NL) ........................................ 2024080

(51) Int. Cl.
*B60R 1/076* (2006.01)
*B60R 1/12* (2006.01)

(52) U.S. Cl.
CPC ...... *B60R 1/076* (2013.01); *B60R 2001/1253* (2013.01); *B60Y 2410/113* (2013.01); *B60Y 2410/12* (2013.01)

(58) Field of Classification Search
CPC ... B60R 1/074; B60R 1/076; B60Y 2410/113; G02B 7/182
(Continued)

(56) References Cited

U.S. PATENT DOCUMENTS 5,384,660 A * 1/1995 Oishi ..................... B60R 1/076
                                                    248/478
6,022,113 A * 2/2000 Stolpe ..................... B60R 1/074
                                                    359/872

(Continued)

FOREIGN PATENT DOCUMENTS

CN    201890193 U    7/2011
CN    108367713 A    8/2018
(Continued)

OTHER PUBLICATIONS

Bing, et al., "Mechanical Assembly Technology," China Light Industry Press, Aug. 31, 2014, and English translation (12 pages).
(Continued)

*Primary Examiner* — Ricky D Shafer
(74) *Attorney, Agent, or Firm* — Volpe Koenig

(57) ABSTRACT

The invention proposes a fastening construction comprising a base part fixedly connectable to a vehicle, a locking element, a spring, and a positioning element. The base part comprises a shaft having an axial contact element extending axially. The spring is configured to surround the outer radial surface of the shaft and be compressed axially. The positioning element comprises a first portion configured to engage and position a first axial end of the spring relative to the shaft, and a second portion configured to cooperate with
(Continued)

a second contact portion of the locking element in the axial direction. The locking element comprises a first contact portion configured to cooperate with the axial contact element of the shaft, and a second contact portion inclined radially outward and/or inward to transmit a force of the spring acting on the positioning element to bias the locking element against the axial contact element.

24 Claims, 8 Drawing Sheets

(58) Field of Classification Search
USPC .......................................... 359/841, 872, 877
See application file for complete search history.

(56) References Cited

U.S. PATENT DOCUMENTS

| | | | | |
|---|---|---|---|---|
| 6,130,514 | A * | 10/2000 | Oesterholt | ............... B60R 1/074 |
| | | | | 359/872 |
| 6,877,867 | B1 * | 4/2005 | Murakami | ............... B60R 1/076 |
| | | | | 359/841 |
| 7,815,324 | B2 * | 10/2010 | Sakata | .................... B60R 1/076 |
| | | | | 248/478 |
| 2004/0233557 | A1 | 11/2004 | Pavao et al. | |
| 2008/0297927 | A1 * | 12/2008 | Onuki | .................... B60R 1/074 |
| | | | | 359/841 |
| 2011/0228412 | A1 | 9/2011 | Sakata | |
| 2018/0111557 | A1 * | 4/2018 | Motomiya | ............... B60R 1/074 |
| 2018/0118111 | A1 | 5/2018 | Umino et al. | |

FOREIGN PATENT DOCUMENTS

| | | |
|---|---|---|
| CN | 108778839 A | 11/2018 |
| GB | 2174934 A | 11/1986 |
| JP | S61-203854 U | 12/1986 |
| JP | 2002-225630 A | 8/2002 |
| JP | 2007-038898 A | 2/2007 |
| JP | 2010-269705 A | 12/2010 |

OTHER PUBLICATIONS

Lu, et al., Illustrated Guide to 100 Key Details in Steel Structure Construction, Harbin Institute of Technology Press, May 31, 2017, and English translation (10 pages).

Search Report received in CN Application No. 2020800807245, mailed Sep. 10, 2025 (4 pages).

* cited by examiner

FASTENING CONSTRUCTION, EXTERIOR VISION UNIT OF A MOTOR VEHICLE AND METHOD FOR ASSEMBLING OR DISASSEMBLING A FASTENING CONSTRUCTION

CROSS REFERENCE TO RELATED APPLICATIONS

This application is a 35 USC § 371 National Stage application of International Patent Application No. PCT/NL2020/050648, which was filed on Oct. 21, 2020, entitled "FASTENING CONSTRUCTION, EXTERIOR VISION UNIT OF A MOTOR VEHICLE AND METHOD FOR ASSEMBLING OR DISASSEMBLING A FASTENING CONSTRUCTION" which claims priority to Netherlands Patent Application No. 2024080, filed Oct. 22, 2019 and is incorporated herein by reference as if fully set forth.

The invention concerns a fastening construction, in particular for an exterior vision unit of a motor vehicle, and exterior vision unit of a motor vehicle and a method for assembling or disassembling such a fastening construction.

Exterior vision units for motor vehicles comprise, for example, rearview mirrors, LiDAR sensors or cameras which allow the driver of the vehicle to view the surrounding area of the vehicle. Exterior vision units generally protrude sideways from the vehicle body so as to offer a sufficient field of view. They generally comprise a base part, which can be fixedly connected to the vehicle, and a housing which houses the mirror or camera. It is customary to design exterior vision units of motor vehicles in such a manner that the housing can pivot towards the vehicle, for instance, in case of a calamity, such as a collision, or to occupy less space in parked condition. The exterior vision units are then designed with a central shaft, which is fixedly connected with the vehicle and around which the housing of the exterior vision unit with the frame, exterior mirror or other provisions can rotate when a particular moment is exceeded. International patent publication WO 2017/128164 A1 shows a fastening construction for an exterior vision unit in which a spring is positioned on the shaft in a manner that biases the spring against a positioning element on the shaft. The shaft comprises a recessed portion on two opposite sides. A horseshoe-shaped fork member is positioned on the shaft so that it rests against the edge of the recessed portion in axial direction. An annular disc is positioned between the end of the spring and the horseshoe-shaped fork wherein the annular disc has an outer edge extending in axial direction away from the spring in order to prevent any radial movement of the horseshoe-shaped fork. It is an object of the invention to improve such a type of fastening construction.

The invention improves fastening constructions described in the art for use in exterior vision units for motor vehicles for example, using a fastening construction comprising the features described in the present application. Such a fastening construction can be used in an exterior vision unit of a motor vehicle. A method for assembling or disassembling such a fastening construction is also described and overcomes problems with exterior vision units described in the art. Further advantageous features of the invention are disclosed in the present application dependent claims.

The invention proposes a fastening construction, in particular, for an exterior vision unit of a motor vehicle, which comprises a base part which can be fixedly connected to a vehicle. The base part comprises a shaft extending in an axial direction, wherein the shaft has an axial contact element which is at least partially orientated in axial direction. A locking element comprises a first contact portion which is configured to cooperate with the axial contact element of the shaft in axial direction. A spring is configured to surround the outer radial surface of the shaft and is compressible in axial direction. The positioning element comprises a first portion that is configured to engage a first axial end of the spring and to position the first axial end of the spring relative to the shaft and a second portion that is configured to cooperate with a second contact portion of the locking element in the axial direction. The locking element has an at least partially annular shape which is configured to cooperate with the axial contact element along its circumference. The second contact portion of the locking element is inclined radially outward from the axial direction and/or the second portion of the positioning element is inclined radially inward from the axial direction to transmit a force of the spring acting on the positioning element in a direction that is inclined radially inwards from the axial direction onto the locking element to bias the locking element against the axial contact element in a direction that is inclined radially inwards from the axial direction. In particular, the second contact portion of the locking element is inclined radially outward relative to the axial direction and/or the second portion of the positioning element is inclined radially inward relative to the axial direction to transmit the force of the spring via the positioning element in a direction that is inclined radially inwards relative to the axial direction onto the locking element to bias the locking element against the axial contact element in a direction that is at an angle to the axial direction.

By providing the second contact portion of the locking element inclined radially outward relative to the axial direction and/or the second portion of the positioning element inclined radially inward relative to the axial direction, the force of the spring generates a force that is directed radially inwards onto the locking element and which, therefore, reinforces the holding strength of the fastening construction. Further, a secure positioning of the locking element against the axial contact element is achieved as the locking element is configured to contact the axial contact element along its circumference. It therefore becomes possible to use a locking element which has a relatively simple construction and geometry as well as axial contact element with a relatively simple geometry.

Within the context of this patent specification, the term 'cooperate with' is to be construed as to at least contact physically, such as to touch, impinge and/or engage. For instance, cooperate with may thus refer to transmitting forces to each other, in particular via direct contact. These expressions are in this context understood to be comprised within the definition of the term 'cooperate with'.

The axial contact element may be formed as a groove, preferably an annular groove, formed in the outer radial surface, in particular mantle surface, of the shaft. This enables a relatively simple geometry of the shaft and therefore enables a simple manufacturing process thereof.

The locking element may have a substantially circular cross-section, which preferably corresponds to a surface of the second portion of the positioning element and/or a contact surface of the axial contact element. This allows a relatively simple geometry of the locking element to come up, for example, as a metal-wire element. By adapting the surface of the second portion of the positioning element and the/or the contact surface of the axial contact element of the shaft to correspond to the cross-section of the locking element, the force transmission between the positioning element, the locking element, and the shaft can be further improved.

Advantageously, the locking element may be made out of a resilient material. This allows the locking element, for example, to be clipped and/or slid into position onto the shaft, in particular towards and/or at the position of the axial contact element. This allows a simple assembly or disassembly of the fastening construction. The locking element may e.g. comprise an open- or closed profile. For instance, the locking element may be formed substantially C-shaped, e.g. provided as a substantially C-shaped clip. Alternatively, the locking element may comprise a continuous, closed profile, e.g. provided as a hoop or a Garter, in particular Garter spring.

The locking element may comprise two or more segments, in particular ring segments. This way, the separate segments of the locking element may each be placed or removed individually, thereby facilitating (dis)assembly.

The axial contact element may be formed as at least two, in particular a plurality of, protrusions which protrude from the outer radial surface of the shaft. This enables for example an alternative manufacturing process of the shaft, for example by providing protrusions formed by sections of the shaft which are bent outwards in radial direction.

The positioning element may be formed of a metal sheet. This allows a simple manufacturing process of the positioning element, for example, by deep-drawing the metal sheet into the desired shape of the positioning element.

The positioning element may have a third portion, axially facing away from the spring which forms more than 10%, preferably more than 25%, further preferably more than 50%, of the surface in radial direction, preferably forming a contact surface for a tool to compress the spring. The third portion enables a simple assembly and disassembly of the fastening construction as the third portion can be used to compress the spring either manually or with the use of a corresponding tool.

The shaft may be made of plastic. This enables a lightweight and inexpensive construction of the fastening construction and exterior vision unit, e.g. made of molded plastic parts. Alternatively, the shaft may be made of metal, e.g. of deep-drawn metal plate or sintered metal.

The fastening constructions may comprise a coupling which is configured to enable a decoupling of a driven part from the base part or from a motor, wherein the coupling contacts a second axial end of the spring and is biased by the spring into a coupled state. This allows the coupling to decouple the driven part from the base part or from the motor in a case in which an exterior force may act on the exterior vision unit, for example, during a collision.

The locking element may be a Garter spring.

The invention further proposes a vision unit of a motor vehicle comprising a fastening construction as disclosed above.

A method for assembling or disassembling a fastening construction, in particular, for an exterior vision unit of a motor vehicle comprises the following steps. A base part is provided comprising a shaft extending in axial direction, wherein the shaft has an axial contact element which is at least partially oriented in axial direction. A spring is arranged on the shaft surrounding the outer radial surface of the shaft and a positioning element is arranged on the shaft so that the positioning element contacts a first axial end of the spring with a first portion. A sub-assembly including the spring and the positioning element is compressed so that the axial contact element is accessible. A locking element is placed or removed on the shaft, the locking element being positioned so that a first contact portion of the locking element contacts the axial contact element of the shaft, wherein the locking elements have at least partially an annular shape which contacts the axial contact element of the shaft along its circumference. The sub-assembly of the spring and the positioning element is released so that spring biases the positioning elements in axial direction such that, when the locking element is in place on the shaft in an assembled state, a second portion of the positioning element contacts a second contact portion of the locking element in axial direction, wherein the second contact portion of the locking element and the second portion of positioning element are configured so as to transmit a force of the spring acting on the positioning element in a direction that is inclined radially inwards from the axial direction onto the locking element to bias the locking element against the actual contact element in a direction that is inclined radially inwards from the axial direction. This method allows a simple and fast assembly and disassembly of the fastening construction.

Further feature and advantages of the invention are disclosed in the following description and the figures on which it is based.

FIG. 1 shows a first embodiment of a fastening construction 1 at different states during the assembly or disassembly. Part A of FIG. 1 shows the fastening construction 1 of FIG. 1 in a disassembled state.

Figure 1:
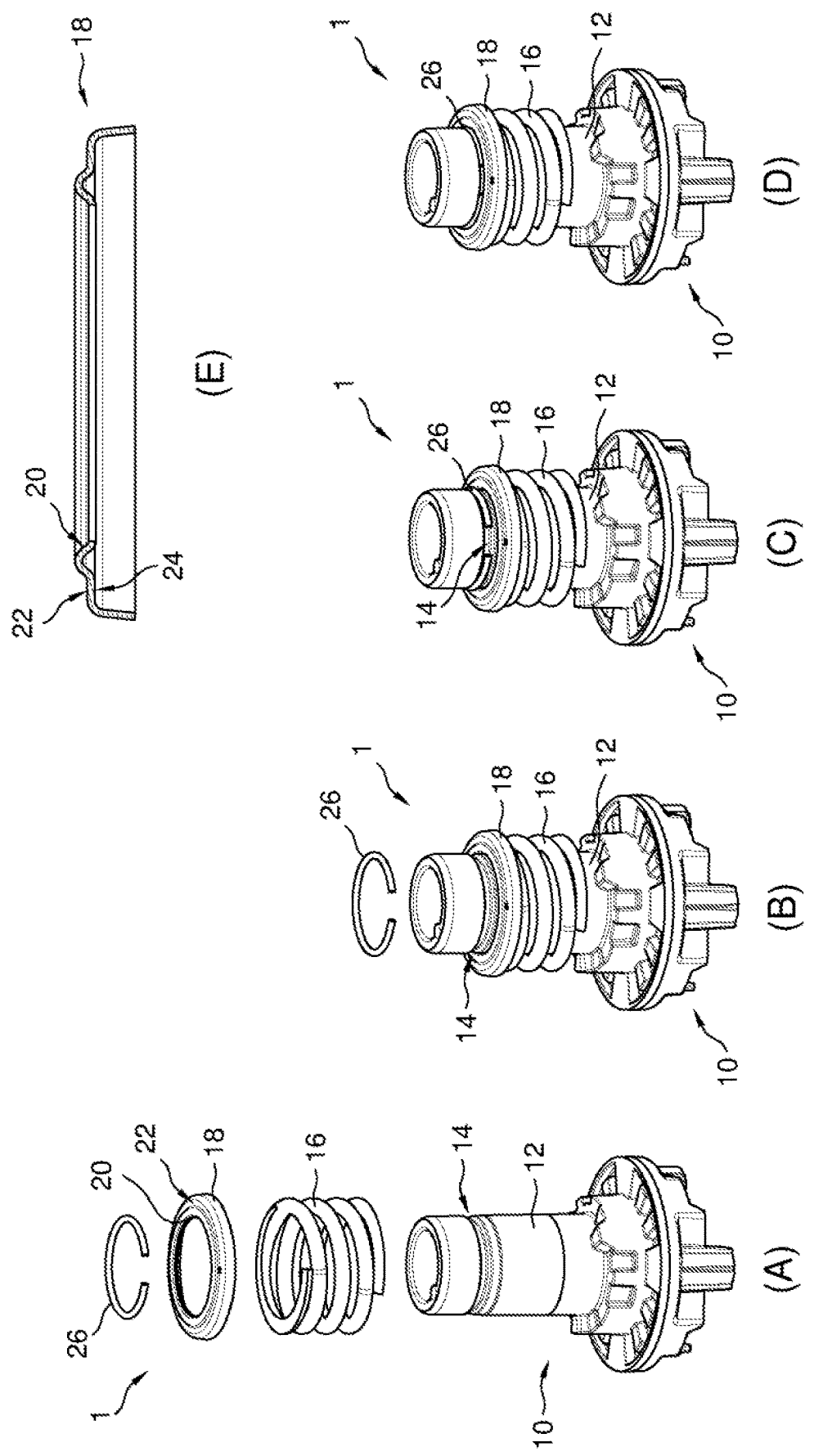
FIG. 1 shows the first embodiment of the fastening construction in different states of assembly and disassembly.

A base part 10 comprises a shaft which extends in an axial direction. The shaft 12 has an axial contact element 14. In the present embodiment, the axial contact element 14 is a groove which extends annularly around the outer radial surface, in particular mantle surface, of the shaft 12.

A spiral spring 16 has an inner diameter large enough to be fitted onto the shaft 12. The spring 16 is compressible in axial direction. In order to position the upper axial end of the spring 16 relative to the shaft 12, a positioning element 18 is provided. In the present embodiment, the positioning element 18 is formed of a metal sheet, for example by deep-drawing. A radially outer edge of the positioning element 18 extends in the axial direction towards the spring 16 so that the axial end of the spring 16 may be positioned within the outer edge of the positioning element 18.

Part E of FIG. 1 shows a section view of the positioning element 18. A lower surface of the positioning element 18 forms a first portion 24 which is configured to cooperate with the first axial end of the spring 16, in particular via direct contact. On the upper surface, the positioning element 18 comprises a second portion 20 which is inclined radially inward from the axial direction (the normal vector of the second portion 20 is at an angle towards the central axis of the shaft 12). Radially outwards of the second portion 20, the positioning element 18 has a third portion 22 which faces away from the spring 16 in axial direction. In the present embodiment, the third portion 22 starts at about an inner edge of the annular positioning element 18 and extends outwards to the edge of the positioning element 18 in radial direction. In this manner, the third portion 22 forms more than circa 50% of the surface in radial direction, which in axial direction faces away from the spring. Hence, the third portion faces substantially opposite to the first portion 24. In other embodiments, the third portion 22 may e.g. form more than circa 10% or more than circa 25% of the surface of the positioning element 18 in radial direction. The third portion 22 may be used to contact the positioning element 18 in order to press it downwards to compress the spring 16 in axial direction. Preferably, the third portion 22 is formed corresponding to a tool 34 designed to compress a sub-assembly comprising the positioning element 18 and spring 16 in axial direction, as e.g. shown in FIG. 4 and discussed later on.

The fastening construction 1 further includes a locking element 26. The locking element 26 of the first embodiment has a partially annular shape and is configured to fit into the groove of the axial contact element 14 of the shaft 12. In this exemplary embodiment, the locking element 26 is formed of a resilient material and can, therefore, be opened and/or expanded to fit over the outer radial surface of the shaft 12 and can contract resiliently when reaching the groove of the axial contact element 14. Here, the locking element 26 has a circular cross-section which preferably corresponds to the contact surface of the groove of the axial contact element 14. Additionally or alternatively, the locking element 26 may be provided as a Garter, in particular Garter spring, or as two, three, four or more separate ring segments together forming e.g. an annular shaped locking element 26. The Garter, in particular Garter spring, as locking element 26 may e.g. be extended to fit over the outer radial surface of the shaft 12 and may contract resiliently when reaching the groove of the axial contact element 14. The Garter may be biased towards the axial contact element 14 under its own resiliency or may for instance rest in its neutral position at least partially within the axial contact element 14 without bias. When the locking element 26 is provided as separate ring segments, the segments may be placed and/or removed subsequently.

Part B of FIG. 1 shows a first step in the assembly of the fastening construction 1. The spring 16 and the positioning element 18 are placed onto the shaft 12 so that the spring surrounds the outer radial surface of the shaft 12 and the positioning element 18 is arranged on the shaft 12 so that positioning element 18 contacts and/or engages the first axial end of the spring 16 with its first portion 24. The sub-assembly including the spring 16 and the positioning element 18 are positioned in radial direction so that the axial contact element 14 with its groove is accessible by compressing the spring 16 via the positioning element 18.

Part C of FIG. 1 shows the next step in the assembly in which the locking element 26 is placed on the shaft 12 and positioned so that the first contact portion 26a of the locking element 26 contacts the axial contact element 14 of the shaft. In the embodiment of FIG. 1, the locking element 26 is, for example, a resilient metal ring, in particular C-shaped clip, which is open on one side in order to be able to resiliently expand to be fitted onto the shaft 12. As the spring 16 and the positioning element 18 are positioned so that the groove of the axial contact element 14 is accessible, the locking element 26 can easily be clipped and/or slid into position inside the groove of the axial contact element 14. In the present embodiment, the locking element 26 therefore contacts the axial contact element 14 along substantially its entire circumference.

Part D of FIG. 1 shows the final step of the assembly of the fastening construction. The sub-assembly of the spring 16 and the positioning element 18 is released so that the spring 16 biases the positioning element 18 in axial direction upwards. The second portion 20 of the positioning element 18 therefore moves upwards in the axial direction and contacts a second contact portion 26b of the locking element 26. The second contact portion 26b of the locking element 26 corresponds to part of the lower radially outward section of the circular cross section of the annular locking element 26 which forms an inclined second contact portion 26b of the locking element 26 whose normal vector is directed at an angle away from the central axis of the shaft 12.

The second portion 20 of the positioning element 18 is inclined radially inward from the axial direction and therefore transmits an axial force of the spring 16 acting on the positioning element 18 in a direction that is inclined radially inwards from the axial direction onto the locking element 26 which biases the locking element 26 against the axial contact element 14 in a direction that is inclined radially inwards from the axial direction. Therefore, the locking element 26 blocks the positioning element 18 from further movement in axial direction and therefore defines a position of the upper axial end of the spring 16 relative to the shaft 12. When the locking element 26 is e.g. resiliently formed and has its own radially inward-facing bias, the spring force transmitted via the positioning element 18 may further bias the locking element 26 in a direction that is inclined radially inwards relative to the axial direction, in particular in a direction that is at an angle to the axial direction.

The fastening construction 1 therefore defines a fixed position of the first axial end of the spring 16 relative to the shaft 12 whereas the position second axial end of the spring 16 may move along the shaft 12 if the spring 12 is compressed.

The fastening construction 1 can likewise be easily disassembled. For disassembly, the positioning element 18 together with the spring 16 is compressed in the axial direction so that the positioning element 18 comes out of contact with the locking element 26 as shown in Part C of FIG. 1. The locking element 26 can then be removed from the groove of the axial contact element 14 on the shaft 12 as shown in part B of FIG. 1.

With the locking element 26 removed the positioning element 18 and the spring 16 can easily be removed from the shaft 12 as shown in Part A of FIG. 1. The fastening construction 1 shown in FIG. 1, therefore, allows a simple assembly and disassembly method to be executed.

Figure 2:
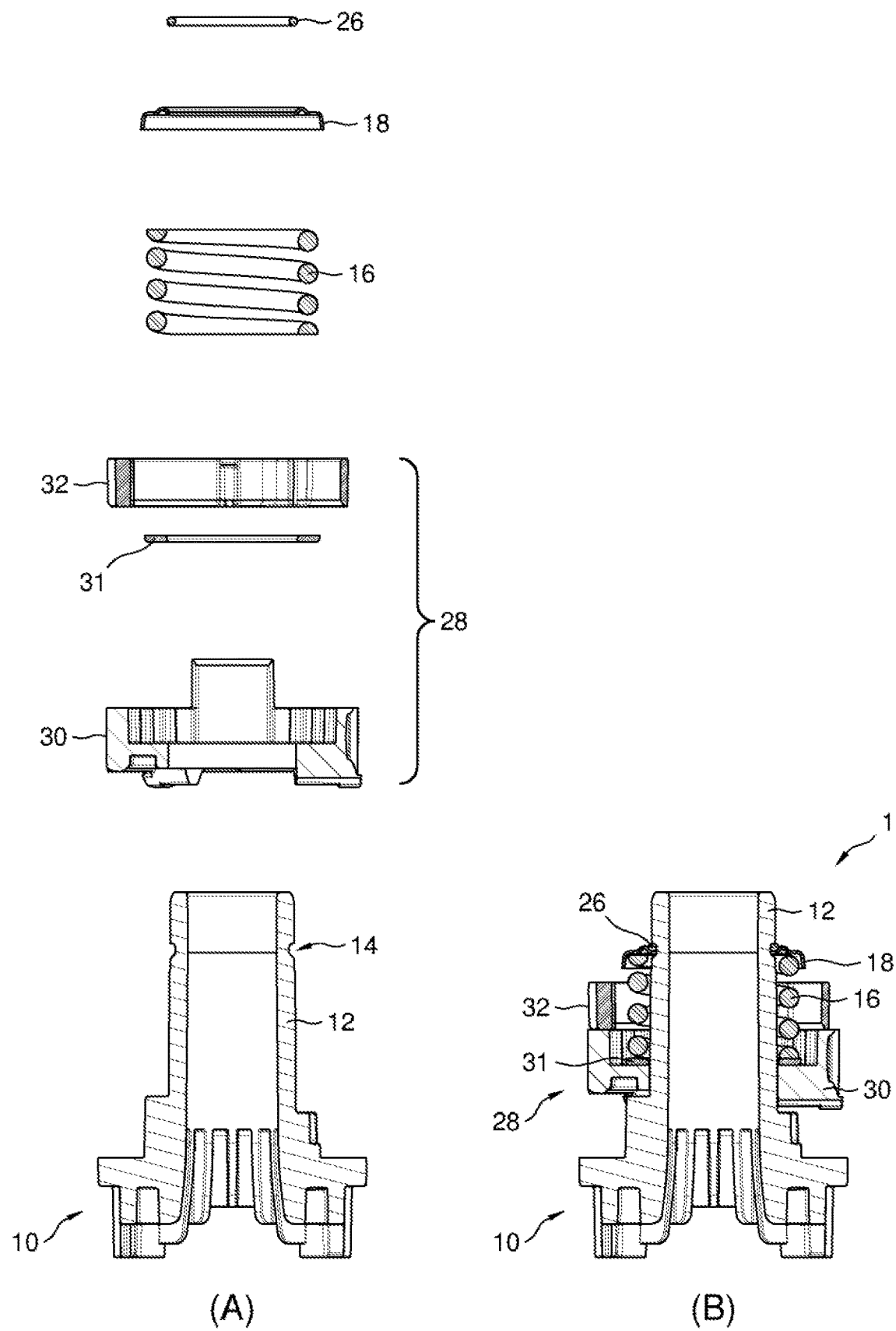
FIG. 2 shows a section view of the embodiment of FIG. 1 and further including a coupling.

FIG. 2 shows the fastening construction 1 of FIG. 1 further including a coupling mechanism, which is configured to enable a decoupling of a driven part from the base part or a motor. Part A of FIG. 2 shows an exploded section view, in which the base part 10, the spring 16, the positioning element 18 and the locking element 26 are identical to the embodiment shown in FIG. 1.

FIG. 2 further shows a mechanism of a coupling 28 including three components. The coupling 28 couples a gear 30 to the base part 10, which gear 30 is typically driven by a motor via a drivetrain (not shown) that are generally provided in a housing of a corresponding exterior vision unit. This allows a rotation e.g. of the mirror or camera housing of the corresponding exterior vision unit relative to the gear 30 and the base part 10 between at least a park (folded-in) and a drive (folded-out) position. In the present embodiment, the spring 16 contacts the coupling 28 with its lower axial end and therefore biases the coupling 28 into a coupled state. In order to protect the motor and/or drivetrain from an external force which may act on the housing of the exterior vision unit, the gear 30 is typically arranged to break loose and de-couple from the base part 10 if the external force is sufficient to lift the gear 30 upward in axial direction against the biasing force of the spring 16. This e.g. allows the housing of the exterior vision unit to be manually folded between at the least the park and drive position and to rotate the gear 30 together with the housing the drivetrain. An adaptor 32 may also be provided.

The fastening construction 1 therefore defines a fixed position of the first axial end of the spring 16 relative to the shaft 12 whereas the gear 30 may move along the shaft 12 if the spring 12 is compressed e.g. by the external force in order to decouple from the base part 10.

If the motor which is not shown in the figures drives the de-coupled gear 30 of the coupling 28, the gear 30 can rotate relatively to the base part 10 and therefore move back into engagement with the base part 10 e.g. in a resetting operation.

Component 31 is an annular disc which serves as a contact portion for the lower axial end of the spring 16 which biases the disc 31 along with the gear 30 into the coupled state of the coupling 28.

Part B of FIG. 2 shows a section view of the assembled fastening construction. The assembled fastening construction essentially corresponds to Part B of FIG. 1 with the addition of the coupling 28. The assembly and disassembly essentially correspond to the assembly and disassembly described in FIG. 1, wherein the coupling 28 is placed onto the shaft 12 before the spring 16 during assembly and is removed after the removal of spring 16 during disassembly of the fastening construction 1.

As can be seen in part B of FIG. 2, coupling structures are provided on the lower surface of the adaptor 32, and at the upper surface of the gear 30 that shape the coupling 28. The adaptor 28 is rotationally locked but axial moveable under spring force. These coupling structures prevent a rotation of the coupling 28 relative to the base part 10 unless a sufficient force is able to compress the spring 16 sufficiently to allow the coupling elements of the adaptor part 32 and the gear part 30 to come out of contact and therefore allow rotation of the base part 10 and the gear part 30 relative to each other. This force may be exerted by an external force acting for example on the housing of the external vision unit.

Figure 3:
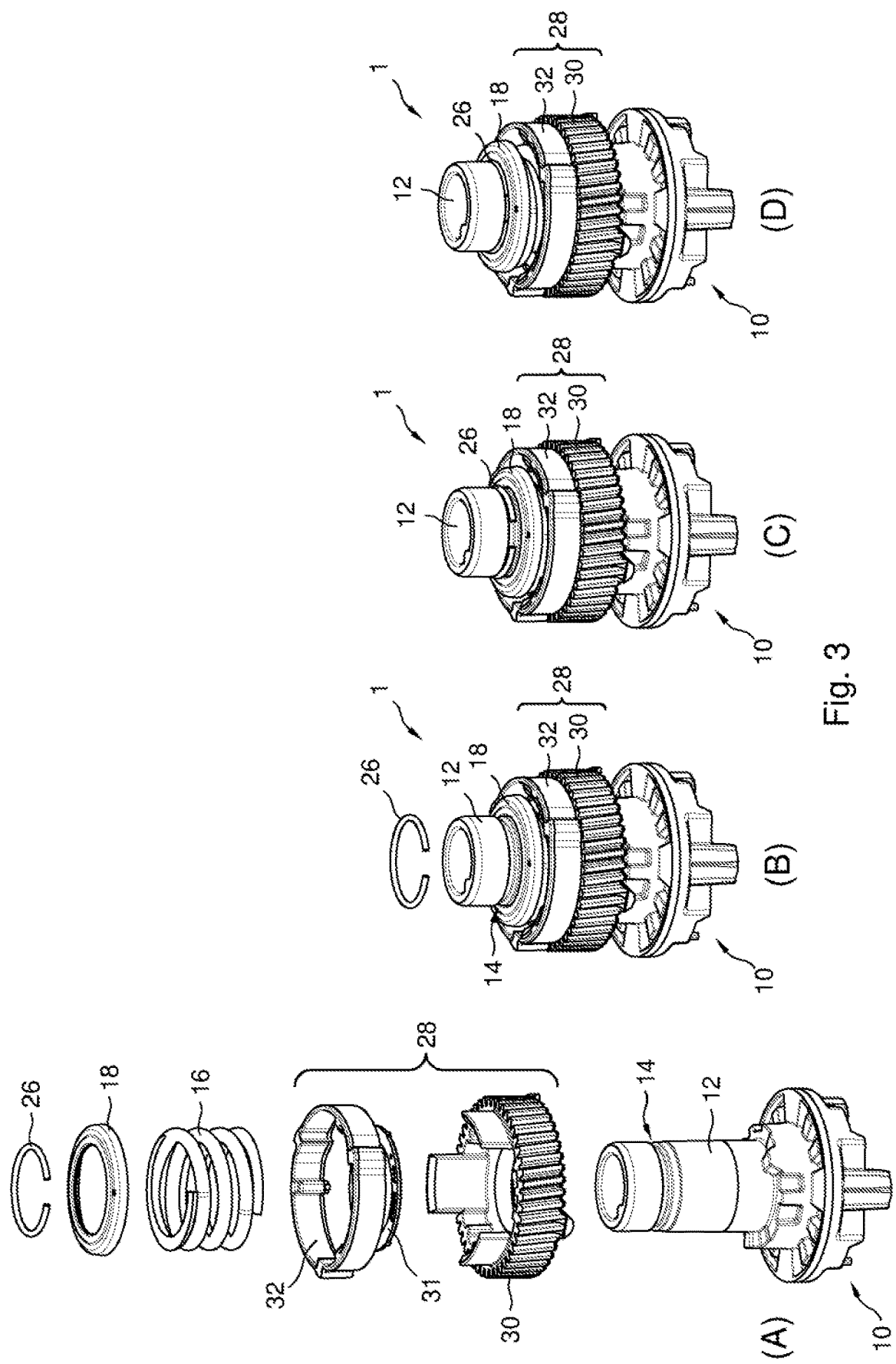
FIG. 3 shows the fastening construction including the coupling according to FIG. 2 in the different states of assembly.

FIG. 3 shows a perspective view of the fastening construction 1 including the coupling 28 wherein part A corresponds to part A of FIG. 2, and Part D of FIG. 3 corresponds to part B of FIG. 2. Part B and C of FIG. 3 show the corresponding assembly and disassembly steps in analogy to part B and C of FIG. 1.

Figure 4:
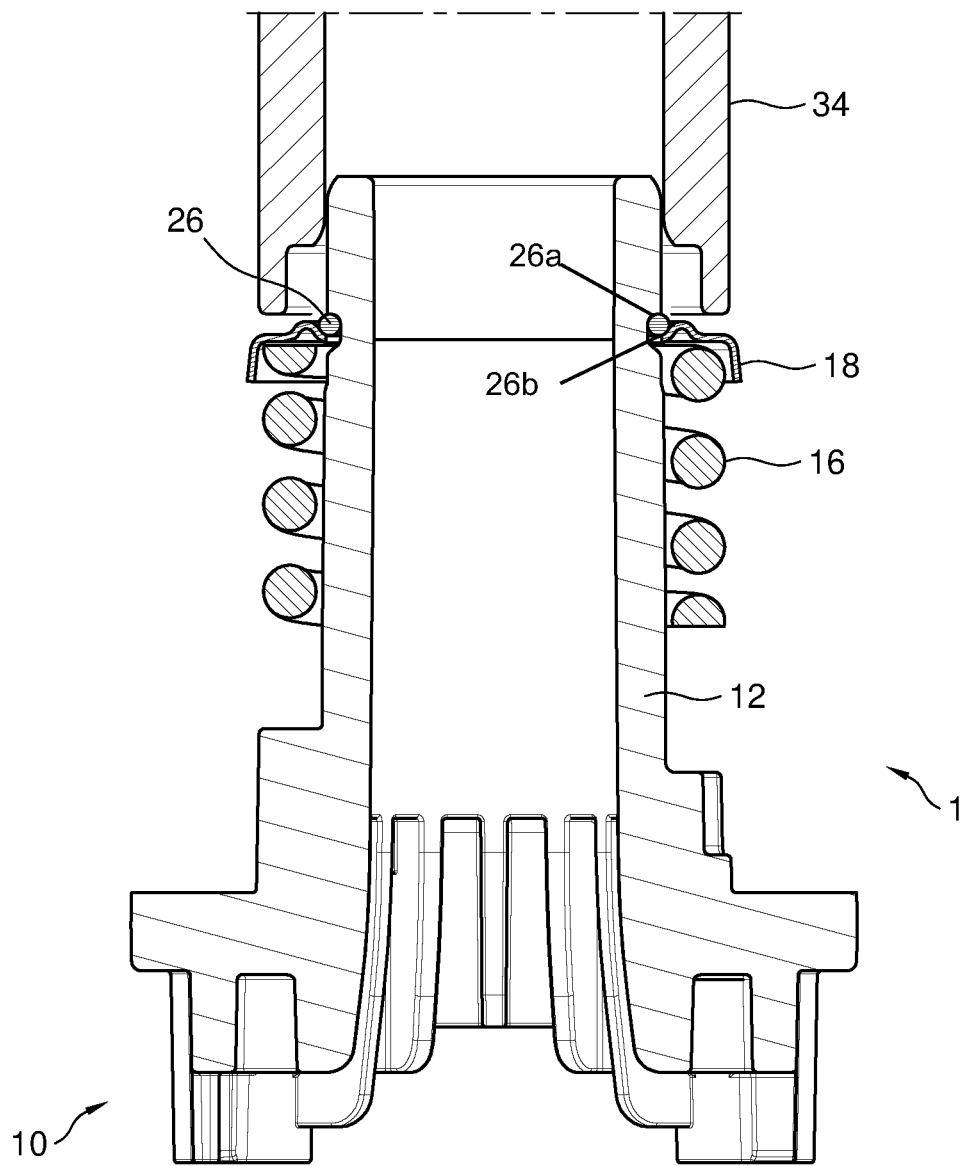
FIG. 4 shows a section view of the embodiment of FIG. 1 and a corresponding tool.

FIG. 4 shows an example of a tool which may be used during the assembly or disassembly of the fastening construction 1. The tool 34 comprises at least one protrusion which extend in axial direction and has an inner diameter or distance corresponding to the diameter of the outer radial surface of the shaft 12, preferably this inner diameter or distance is slightly larger than the diameter of the outer radial surface of the shaft 12. The at least one protrusion can, therefore, be placed over the shaft 12 and the at least one protrusion and shaft 12 may subsequently move relative each other in the axial direction. On the axial end the or each at least one protrusion a step portion is provided in which the distance or diameter between the or each at least one protrusion is greater than the distance between the outer radial surface of the locking element 26.

When the tool 34 is placed on the shaft 12 in axial direction, the at least one protrusion first comes into contact with the third portion 22 of the positioning element 18 and therefore allows the compression of the sub-assembly including the spring 16 and the positioning element 18 in axial direction. When the sub-assembly is compressed in axial direction, the grove of the axial contact element 14 can be positioned in the step portion of the tool 34, therefore making the grove of the axial contact element 14 accessible so that the locking element 26 can easily be installed or removed for assembly or disassembly respectively.

The at least one protrusion of the tool 34 may be a continuous profile extending in a circumferential direction or any number of protrusions that may be spaced around the circumference of the shaft as long as they enable the positioning and removal of the locking element 26.

The base part 10 of the fastening construction 1 of the embodiment shown in FIGS. 1 to 4 is preferably made of plastic and can easily be formed in a molding process. This allows in particular inexpensive manufacture and a light-weight component. Alternatively, the shaft 12 and/or the entire base part 10 can be made of metal.

Figure 5:
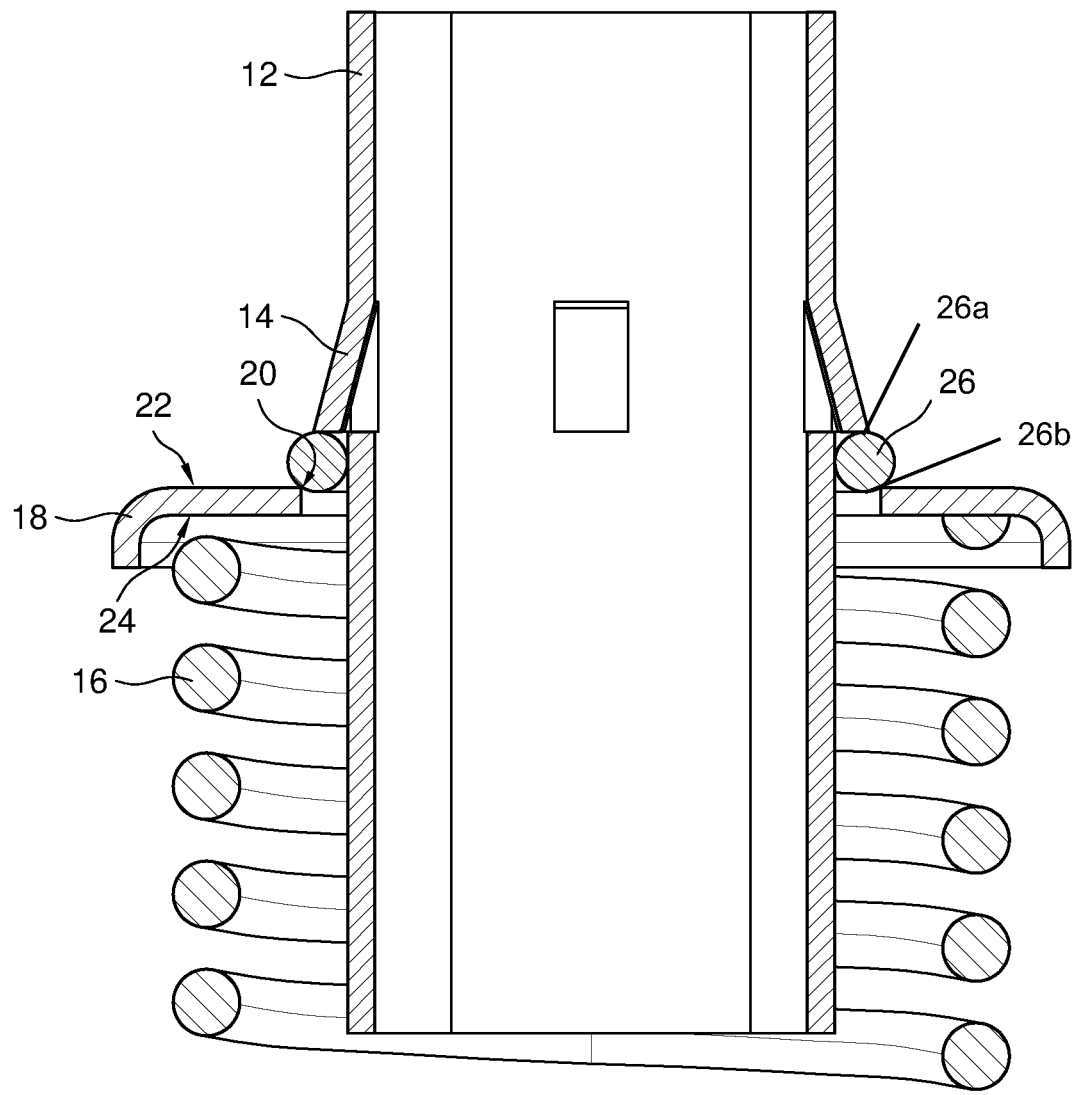
FIG. 5 shows a section view of a second embodiment of the fastening construction.
Figure 6:
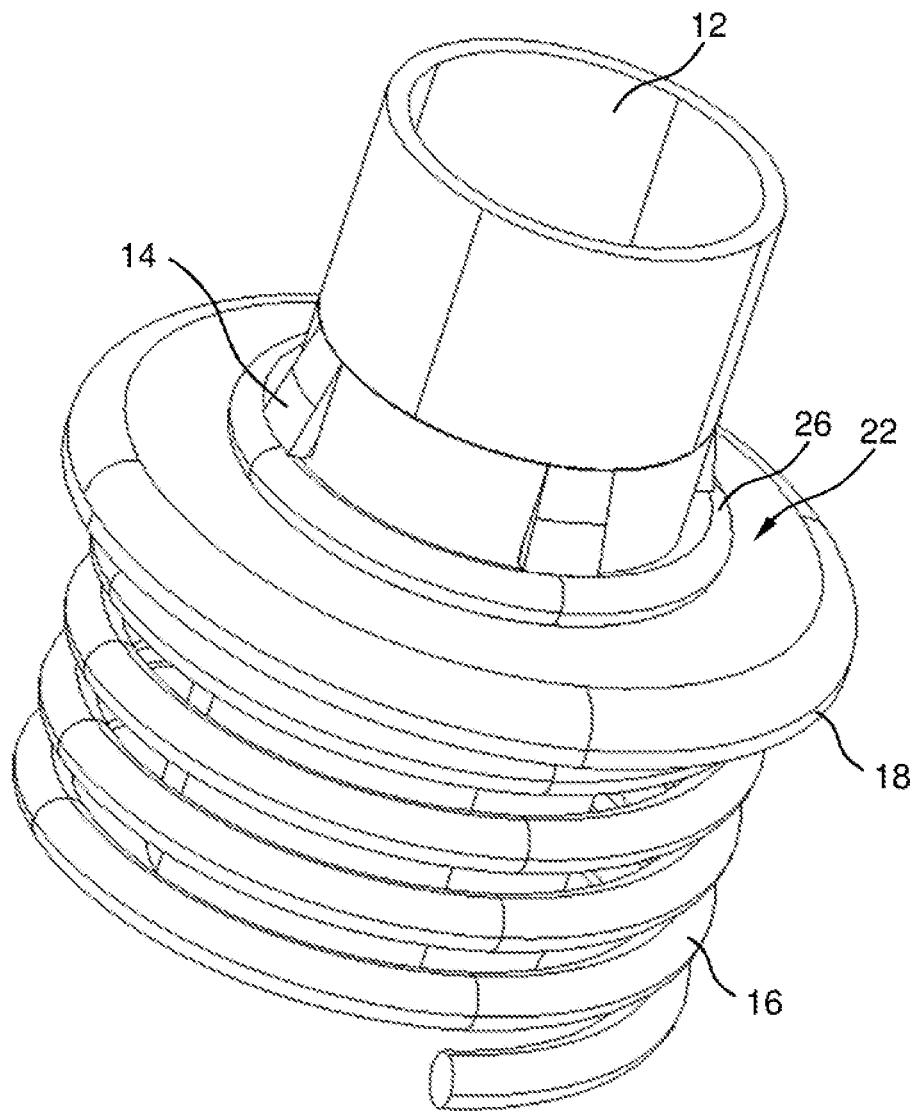
FIG. 6 shows a perspective view of the fastening construction of FIG. 5.
Figure 7:
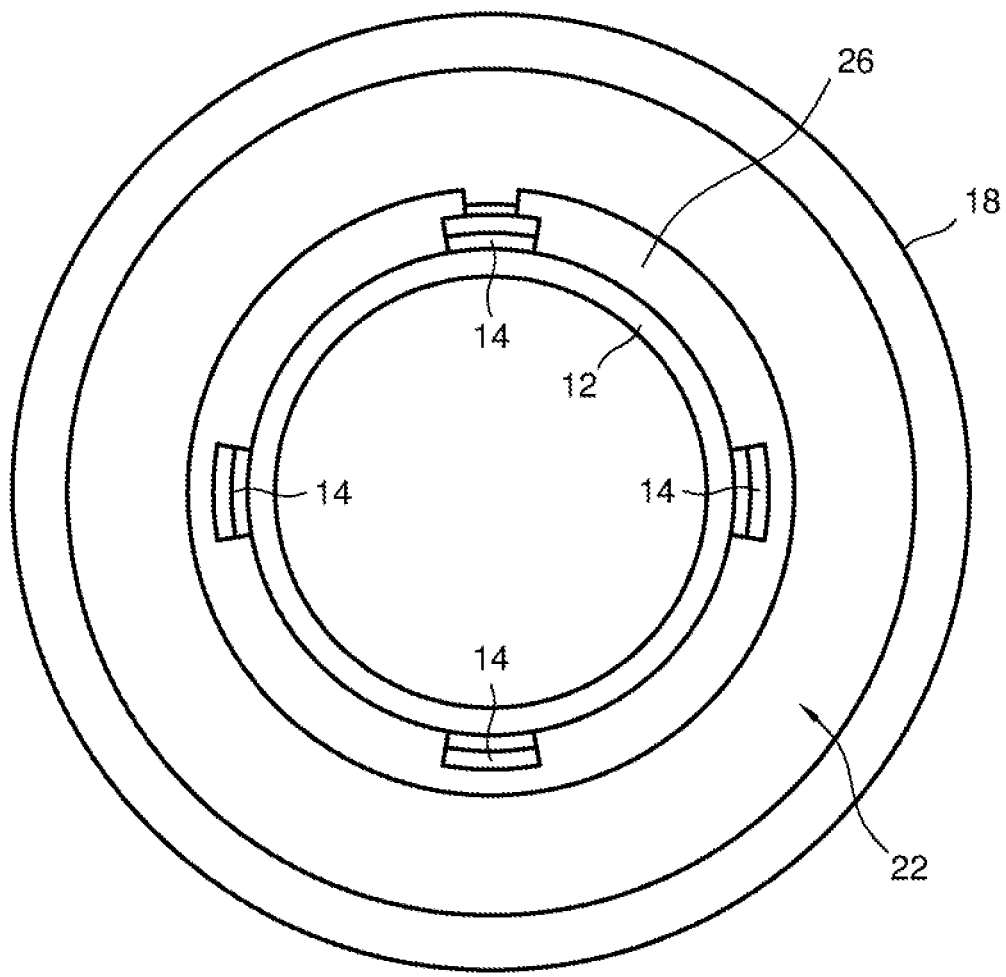
FIG. 7 shows a top view of the fastening construction of FIG. 5.

FIG. 5, FIG. 6 and FIG. 7 show a second embodiment of a fastening construction 1 according to the invention. FIG. 5 shows a section view of the fastening construction 1, FIG. 6 shows a perspective view of the fastening construction 1 and FIG. 7 shows a top view of the fastening construction 1 in axial direction downwards.

FIG. 5 shows a section view in which a shaft 12 is formed with axial contact element 14 which protrude from the outer radial surface of the shaft 12. In the example embodiment, the shaft 12 includes four protrusions as axial contact element 14 which are formed by cut out portions of the shaft 12 which are bent outwards in radial direction. However, it is also possible to have a different number of protrusions or a different geometry. For example, it may also be possible to simply deform the shaft 12 outwards or inwards in radial direction, therefore creating an axial contact element 14 which is at least partially orientated in axial direction. For instance, the shaft 12 may be deformed using roll grooving in particular in a cold forming process to displace a relatively small portion of the shaft 12 radially inwardly to form the groove as axial contact element 14.

The end of the bent-out or rolled-in sections of the shaft 12 cooperate with, in particular are in direct contact with, the locking element 26, which essentially corresponds to the locking element 26 of the first embodiment, along their circumference and prevent a movement of the locking element 26 in axial direction upwards.

Compared to the first embodiment, the positioning element 18 of the second embodiment has a simplified geometry in that the positioning element 18 is formed of a metal sheet which is orientated in radial direction and wherein only the radially outer edge is bent in axial direction towards the spring 16. The spring 16, therefore, contacts the positioning element 18 at a first portion 24 on the bottom side of the positioning element 14.

The radially inner edge of the positioning element 18 has a diameter which is larger than an outer diameter defined by radial ends of the axial contact element 14 formed by the protrusions of the outward end sections of the shaft 12. In contrast to the first embodiment, the positioning element 18 of the second embodiment does not have a second portion 20 that contacts that is inclined radially inward from the axial direction. In this second exemplary embodiment, the second portion 20 is formed by the upper edge of the inside inner end of the annular positioning element 18. However, this upper edge forming the second portion 20 may e.g. be inclined radially inward relative to the axial direction or formed correspondingly with the second contact portion 26b of the locking element 26. Here, the second portion 20 of the positioning element 18 contacts the circular cross-section of the locking element 26 at a position in which the tangent of the surface of the locking element 26 is inclined radially outwards relative to the axial direction, therefore providing a second portion of the locking element 26 which is inclined radially outward relative to the axial direction, in particular locally at the point of contact with the second portion 20 of the positioning element 18.

The force of the spring 16 therefore, biases the positioning element 18 upwards in axial direction so that the second portion 20 of the positioning element 18 being the upper inner edge of the positioning element 18 presses against the inclined tangent of the surface forming the second contact portion 26b of the locking element 26. Therefore, the force of the spring 16 biases the locking element 26 via the second portion 20 of the positioning element 18 against the axial contact element 14 in a direction that is inclined radially inwards relative to the axial direction, in particular at an angle to the axial direction.

The second embodiment, therefore, likewise strengthens the positioning mechanism of the fastening construction 1. In the second embodiment, the shaft 12 is made of metal, however the shaft 12 may also be formed of plastic, having protrusions of similar geometry to the at least two protrusions of the axial contact element 14 but which may be formed directly rather than being bent out sections of the shaft 12.

Figure 8:
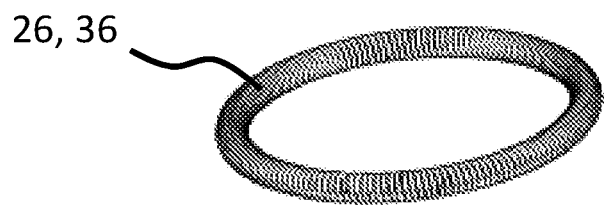
FIG. 8 shows a Garter spring as a locking element.
Figure 9:
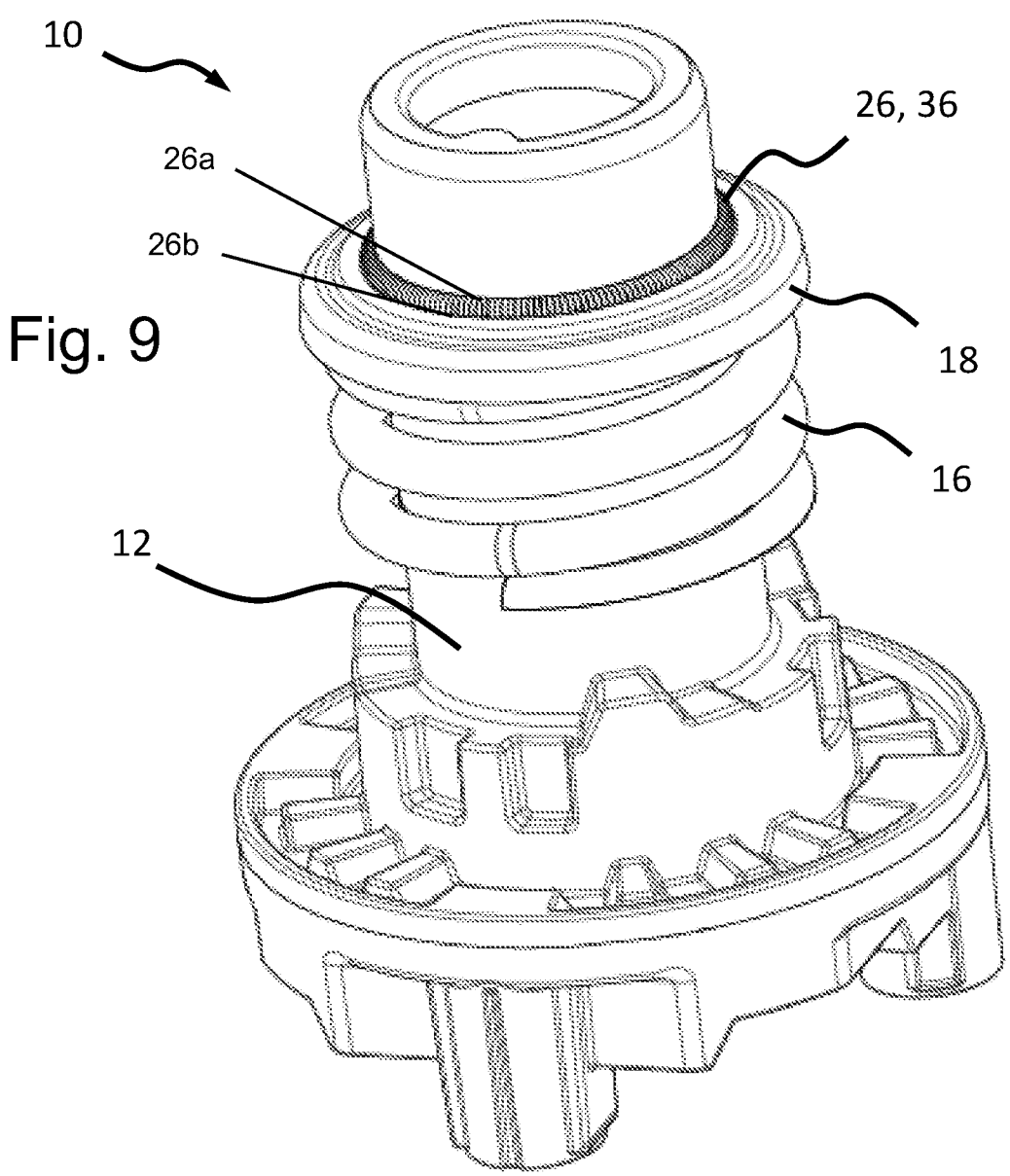
FIG. 9 shows a third embodiment of the fastening construction with the Garter spring of FIG. 8 as the locking element.

FIGS. 8 and 9 show a fastening construction according to a third embodiment of the invention in which the locking element 26 is a Garter spring 36. FIG. 8 shows the Garter spring 36 which is a coiled spring that is connected at each end to create a circular shape. FIG. 9 shows the fastening construction 1 which is similar to the embodiment of FIG. 1 (D), wherein the partially annular locking element 26 of the first embodiment is replaced by the Garter spring 36 and the groove of the axial contact element 14 of the shaft 12 is adapted to accordingly to the shape of the Garter spring. The Garter spring in its relaxed state neutral position may have an inner diameter corresponding to or smaller than the smallest circumference of the groove of the axial contact element 14 so that the Garter spring is extended to fit over the outer radial surface of the shaft 12 and contracts resiliently when reaching the groove of the axial contact element 14. The Garter may be biased towards the axial contact element 14 under its own resiliency or may for instance rest in its neutral position at least partially within the axial contact element 14 without bias.

Different aspects of the different embodiments may be combined, in particular to allow individual components, such as the locking element 26 or the positioning element 18 to be used for multiple embodiments.

LIST OF REFERENCE SIGNS

1. Fastening construction
10. Base part
12. Shaft
14. Axial contact element/groove
16. Spring
18. Positioning element
20. Second portion of positioning element
22. Third portion of positioning element
24. First portion of positioning element
26. Locking element
26a. First contact portion of locking element
26b. Second contact portion of locking element
28. Coupling
30. Gear
31. Annular disk
32. Adaptor
34. Tool
36. Garter spring

The invention claimed is:

1. A fastening construction comprising a base part which can be fixedly connected to a vehicle,
the base part comprising a shaft extending in an axial direction, wherein the shaft has an axial contact element which is at least partially oriented in axial direction;
a locking element which comprises a first contact portion which is configured to cooperate with the axial contact element of the shaft in the axial direction;
a spring which is configured to surround an outer radial surface of the shaft and to be compressed in the axial direction; and
a positioning element comprising a first portion configured to engage a first axial end of the spring and to position the first axial end of the spring relative to the shaft and a second portion configured to cooperate with a second contact portion of the locking element in the axial direction;
wherein
the locking element has an at least partially annular shape which is configured to cooperate with the axial contact element along its circumference, and
the second contact portion of the locking element is inclined radially outward relative to the axial direction at a point of contact with the second portion to transmit a force of the spring acting on the positioning element in a direction that is inclined radially inwards relative to the axial direction onto the locking element to bias the locking element against the axial contact element in a direction that is inclined radially inwards relative to the axial direction.

2. The fastening construction according to claim 1, wherein the axial contact element is formed as a groove formed in the outer radial surface of the shaft.

3. The fastening construction according to claim 2, wherein the groove is an annular groove.

4. The fastening construction according to claim 1, wherein the locking element has a substantially circular cross section.

5. The fastening construction according to claim 4, wherein the cross section of the locking element corresponds to a surface of the second portion of the positioning element.

6. The fastening construction according to claim 4, wherein the cross section of the locking element corresponds to a contact surface of the axial contact element.

7. The fastening construction according to claim 1, wherein the locking element is resilient to be clipped into position.

8. The fastening construction according to claim 1, wherein the locking element comprises two or more segments.

9. The fastening construction according to claim 1, wherein the axial contact element is formed as at least two protrusions which protrude from the outer radial surface of the shaft.

10. The fastening construction according to claim 1, wherein the positioning element is formed of a metal sheet.

11. The fastening construction according to claim 1, wherein the positioning element has a third portion axially facing away from the spring which forms more than 10% of the surface in a radial direction.

12. The fastening construction according to claim 11, wherein the positioning element has a third portion axially facing away from the spring which forms more than 50%, of the surface in a radial direction.

13. The fastening construction according to claim 11, wherein the positioning element has a third portion axially facing away from the spring which is provided as a contact surface for a tool to compress the spring.

14. The fastening construction according to claim 1, wherein the shaft is made of plastic.

15. The fastening construction according to claim 1, wherein the shaft is made of metal.

16. The fastening construction according to claim 1, wherein a coupling, which is configured to enable a decoupling of a driven part from the base part, contacts a second axial end of the spring and is biased by the spring into a coupled state.

17. The fastening construction according to claim 1, wherein the locking element is a Garter spring.

18. An exterior vision unit of a motor vehicle comprising the fastening construction according to claim 1.

19. The exterior vision unit according to claim 18, wherein the locking element is a Garter spring.

20. The fastening construction according to claim 1, wherein the second contact portion of the positioning element is inclined radially inward relative to the axial direction to transmit a force of the spring acting on the positioning element in a direction that is inclined radially inwards relative to the axial direction onto the locking element to bias the locking element against the axial contact element in a direction that is inclined radially inwards relative to the axial direction.

21. The fastening construction according to claim 1, wherein the locking element is resilient to be slid into position.

22. The fastening construction according to claim 1, wherein a coupling, which is configured to enable a decoupling of a driven part from a motor, contacts a second axial end of the spring and is biased by the spring into a coupled state.

23. The fastening construction according to claim 1, wherein the locking element is made out of a resilient material and comprises a continuous, closed profile.

24. A method for assembling or disassembling a fastening construction, comprising:
providing a base part comprising a shaft extending in an axial direction, wherein the shaft has an axial contact element which is at least partially oriented in the axial direction, a spring arranged on the shaft surrounding an outer radial surface of the shaft and a positioning element arranged on the shaft so that the positioning element contacts a first axial end of the spring with a first portion;
compressing a subassembly including the spring and the positioning element so that the axial contact element is accessible;
placing or removing a locking element on the shaft positioned so that a first contact portion of the locking element contacts the axial contact element of the shaft, wherein the locking element has an at least partially annular shape which contacts the axial contact element of the shaft along its circumference; and
releasing the subassembly of the spring and the positioning element so that the spring biases the positioning element in the axial direction such that, when the locking element is in place on the shaft, a second portion of the positioning element contacts a second contact portion of the locking element in the axial direction, wherein the second contact portion of the locking element and the second contact of the positioning element are configured so as to transmit a force of the spring acting on the positioning element in a direction that is inclined radially inwards from the axial direction onto the locking element to bias the locking element against the axial contact element in a direction that is inclined radially inwards from the axial direction.

* * * * *